United States Patent
Luo et al.

(10) Patent No.: US 7,372,996 B2
(45) Date of Patent: May 13, 2008

(54) METHOD AND APPARATUS FOR DETERMINING THE POSITION OF A VEHICLE SEAT

(75) Inventors: Yun Luo, Livonia, MI (US); Jon K. Wallace, Redford, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 679 days.

(21) Appl. No.: 11/023,158

(22) Filed: Dec. 27, 2004

(65) Prior Publication Data

US 2006/0140446 A1   Jun. 29, 2006

(51) Int. Cl.
   *G06K 9/46*   (2006.01)
(52) U.S. Cl. ............... 382/203; 382/199; 382/291; 382/103; 382/154; 382/173
(58) Field of Classification Search ........... 382/107, 382/100, 103, 104, 154, 173, 176, 236, 199, 382/203, 291; 348/154, 155, 148, 169; 356/3; 701/45
See application file for complete search history.

(56) References Cited

U.S. PATENT DOCUMENTS 5,911,001 A   6/1999   Kawada
6,154,566 A   11/2000  Mine et al.
6,480,616 B1 *  11/2002  Hata et al. .................. 382/106
6,713,001 B1 *  3/2004  Cannon et al. ............ 264/40.1
6,757,009 B1   6/2004   Simon et al.
2002/0181742 A1 * 12/2002  Wallace et al. ............. 382/104
2004/0040772 A1 *  3/2004  Ertl et al. .................... 180/271

FOREIGN PATENT DOCUMENTS

| DE | 199 45 645 A1 | 4/2000 |
| DE | 100 63 697 A1 | 7/2002 |
| EP | 1 482 448 A2 | 12/2004 |
| WO | WO 01/19648 A1 | 3/2001 |
| WO | WO 02/21427 A2 | 3/2002 |
| WO | WO-2004/042673 A2 | 5/2004 |

\* cited by examiner

*Primary Examiner*—Samir Ahmed
*Assistant Examiner*—Ali A. B Bayat
(74) *Attorney, Agent, or Firm*—Tarolli, Sundheim, Covell & Tummino LLP (57) ABSTRACT

Systems and methods are provided for editing an image of a vehicle interior to isolate the occupant of a vehicle seat. An image generator (102) generates an image of a vehicle interior. A contour generator (104) produces a contour image from the generated image. A model selector (106) selects a contour model from a plurality of contour models according to the similarity of the contour model to a portion of the contour image. An image editor (108) removes a portion of the generated image representing at least a portion of the vehicle seat according to the selected contour model to produce an image of an occupant of the vehicle seat.

22 Claims, 7 Drawing Sheets

METHOD AND APPARATUS FOR DETERMINING THE POSITION OF A VEHICLE SEAT

TECHNICAL FIELD

The present invention is directed generally to vehicle occupant protection systems and is particularly directed to a method and apparatus for determining the position of a vehicle seat within an image of the vehicle interior.

BACKGROUND OF THE INVENTION

Actuatable occupant restraining systems having an inflatable air bag in vehicles are known in the art. Such systems that are controlled in response to whether the seat is occupied, an object on the seat is animate or inanimate, a rearward facing child seat present on the seat, and/or in response to the occupant's position, weight, size, etc., are referred to as smart restraining systems. One example of a smart actuatable restraining system is disclosed in U.S. Pat. No. 5,330,226.

Pattern recognition systems can be loosely defined as systems capable of distinguishing between classes of real world stimuli according to a plurality of distinguishing characteristics, or features, associated with the classes. Many smart actuatable restraint systems rely on pattern recognition systems to identify the nature of the occupant of a vehicle seat. For example, if it is determined that a seat is empty, it is advantageous to refrain from actuating a protective device. In addition, the classification can provide knowledge of certain characteristics of the occupant that are helpful in tracking the occupant's movements in the vehicle. Such tracking can further increase the effectiveness of the actuatable restraint system.

One difficultly in classifying a vehicle occupant arises in separating the portion of an image representing a vehicle seat from the portion of the image representing its occupant. A past solution has been to classify the combined image of the seat and its occupant, with an empty seat as an additional occupant class. This method, while effective, requires very fine discrimination from the classifier or classifiers used to make the determination, as the presence of the seat back can mute certain characteristics desirable for distinguishing between the classes. For example, the seat back can be misconstrued as an adult torso when a rearward facing child seat is present, causing a misclassification of the occupant as an adult.

Just as the presence of the seat back is inconvenient for classifying a vehicle occupant, the presence of the headrest in an image can complicate attempts to identify and track an occupant's head. The headrest has a similar shape to a low resolution human head. It is at the same height as the head and near the same location, making it a favorable candidate for head identification. Removing the headrest from a pool of head candidates prior to determining the position of the head could greatly increase the robustness of a head tracking algorithm.

SUMMARY OF THE INVENTION

In accordance with one aspect of the present invention, a system is provided for editing an image of a vehicle interior to isolate the occupant of a vehicle seat. An image generator generates an image of a vehicle interior. A contour generator produces a contour image from the generated image. A model selector selects a contour model from a plurality of contour models according to the similarity of the contour model to a portion of the contour image. An image editor removes a portion of the generated image representing at least a portion of the vehicle seat according to the selected contour model to produce an image of an occupant of the vehicle seat.

In accordance with another aspect of the present invention, a method is provided for preprocessing an image of a vehicle interior to remove a portion of the image corresponding to a seat back. A contour image is generated from the image. One of a plurality of contour models that most closely matches the generated contour image is selected. A given contour model is associated with one of a plurality of possible seat positions. A plane of separation is determined between a seat back and a seat occupant within the image based on the selected contour model. A portion of the image corresponding to the seat back is removed based on the determined plane of separation to isolate an image of the seat occupant.

In accordance with yet another aspect of the present invention, a computer program product, implemented in a computer readable medium and operative in a data processing system, is provided for editing an image of a vehicle interior to isolate the occupant of a vehicle seat. A contour generator produces a contour image from one or more generated images. A model selector selects a contour model from a plurality of contour models according to the contour image and an associated selection algorithm. An image editor edits the generated image to remove a portion of the image representing the vehicle seat according to the selected contour model.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DESCRIPTION OF PREFERRED EMBODIMENT

Figure 1:
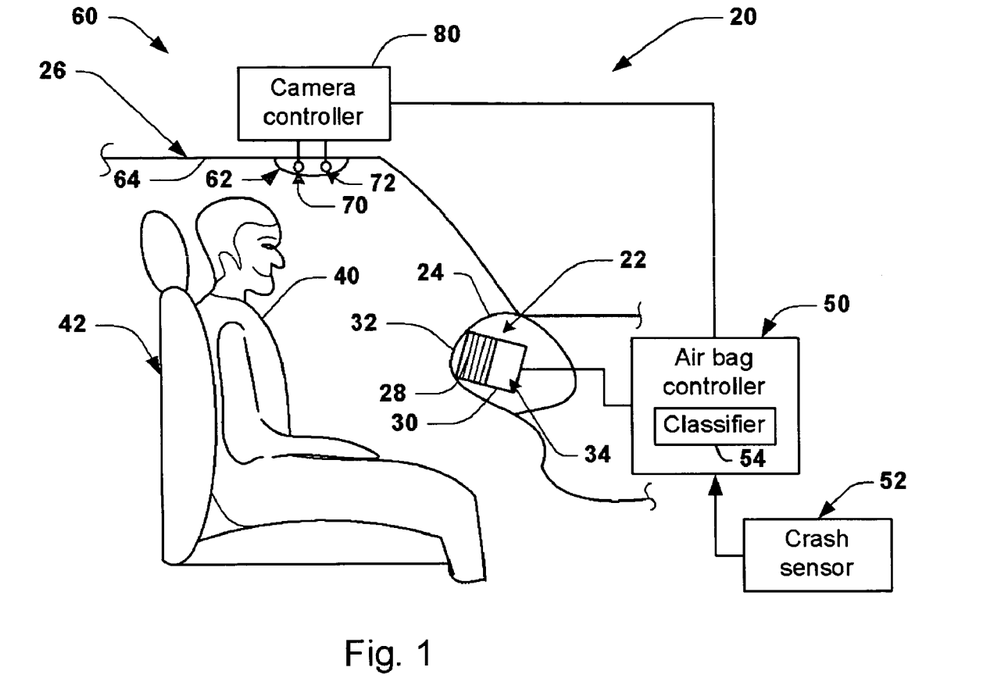
FIG. 1 is a schematic illustration of an actuatable restraining system in accordance with an exemplary embodiment of the present invention.

Referring to FIG. 1, an exemplary embodiment of an actuatable occupant restraint system 20, in accordance with the present invention, includes an air bag assembly 22 mounted in an opening of a dashboard or instrument panel 24 of a vehicle 26. The air bag assembly 22 includes an air bag 28 folded and stored within the interior of an air bag housing 30. A cover 32 covers the stored air bag and is adapted to open easily upon inflation of the air bag 28.

The air bag assembly 22 further includes a gas control portion 34 that is operatively coupled to the air bag 28. The gas control portion 34 may include a plurality of gas sources (not shown) and vent valves (not shown) for, when individually controlled, controlling the air bag inflation, (e.g., timing, gas flow, bag profile as a function of time, gas pressure, etc.). Once inflated, the air bag 28 may help protect an occupant 40, such as a vehicle passenger, sitting on a vehicle seat 42. Although the embodiment of FIG. 1 is described with regard to a vehicle passenger seat, it is applicable to a vehicle driver seat and back seats and their associated actuatable restraining systems. The present invention is also applicable to the control of side actuatable restraining devices and to actuatable devices deployable in response to rollover events.

An air bag controller 50 is operatively connected to the air bag assembly 22 to control the gas control portion 34 and, in turn, inflation of the air bag 28. The air bag controller 50 can take any of several forms such as a microcomputer, discrete circuitry, an application-specific-integrated-circuit ("ASIC"), etc. The controller 50 is further connected to a vehicle crash sensor 52, such as one or more vehicle crash accelerometers. The controller monitors the output signal(s) from the crash sensor 52 and, in accordance with an air bag control algorithm using a deployment control algorithm, determines if a deployment event is occurring (i.e., an event for which it may be desirable to deploy the air bag 28 ). There are several known deployment control algorithms responsive to deployment event signal(s) that may be used as part of the present invention. Once the controller 50 determines that a deployment event is occurring using a selected crash analysis algorithm, for example, and if certain other occupant characteristic conditions are satisfied, the controller 50 controls inflation of the air bag 28 using the gas control portion 34, (e.g., timing, gas flow rate, gas pressure, bag profile as a function of time, etc.).

The air bag restraining system 20, in accordance with the present invention, further includes a stereo-vision assembly 60. The stereo-vision assembly 60 includes stereo-cameras 62 preferably mounted to the headliner 64 of the vehicle 26. The stereo-vision assembly 60 includes a first camera 70 and a second camera 72, both connected to a camera controller 80. In accordance with one exemplary embodiment of the present invention, the cameras 70, 72 are spaced apart by approximately 35 millimeters ("mm"), although other spacing can be used. The cameras 70, 72 are positioned in parallel with the front-to-rear axis of the vehicle, although other orientations are possible.

The camera controller 80 can take any of several forms such as a microcomputer, discrete circuitry, ASIC, etc. The camera controller 80 is connected to the air bag controller 50 and provides a signal to the air bag controller 50 to provide data relating to various image characteristics of the occupant seating area, which can range from an empty seat, an object on the seat, a human occupant, etc. Herein, image data of the seating area is generally referred to as occupant data, which includes all animate and inanimate objects that might occupy the occupant seating area. The air bag control algorithm associated with the controller 50 can be made sensitive to the provided image data. For example, if the provided image data indicates that the occupant 40 is an object, such as a shopping bag, and not a human being, actuating the air bag during a crash event serves no purpose. Accordingly, the air bag controller 50 can include a pattern recognition classifier assembly 54 operative to distinguish between a plurality of occupant classes based on the image data provided by the camera controller 80 that can then, in turn, be used to control the air bag.

Figure 2:
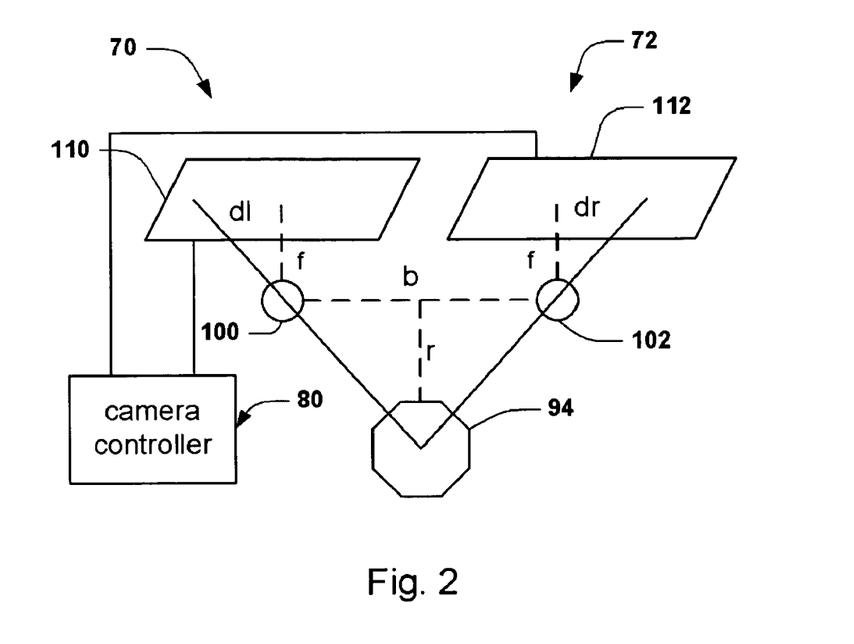
FIG. 2 is a schematic illustration of a stereo camera arrangement for use with the present invention.

FIG. 2 is a schematic illustration of the cameras 70 and 72 of the imaging device. The cameras 70 and 72 may be of any several known types. For example, the cameras may be charge-coupled devices ("CCD") or complementary metal-oxide semiconductor ("CMOS") devices. Preferably, the cameras 70 and 72 take two-dimensional, grayscale images of the passenger compartment of the vehicle 26. In one exemplary embodiment of the present invention, the cameras 70 and 72 are wide spectrum response cameras that cover the visible and near-infrared spectrums.

The cameras 70 and 72 are spaced apart from one another so as to enable the cameras to be used for determining a distance, also called a "range," from the cameras to an object. The object is shown schematically in FIG. 2 and is indicated by reference numeral 94. The distance between the cameras 70 and 72 and the object 94 may be determined by using triangulation. The cameras 70 and 72 have different views of the passenger compartment due to the position of the object 94 relative to each camera 70 and 72 being different. As a result, the object 94 is located at a different position in the image obtained by camera 70 than in the image obtained by camera 72. The difference in the positions of the object 94 in the images is referred to as "disparity." To get a proper disparity between the images for performing triangulation, it is desirable for the cameras 70 and 72 to be positioned so that the object 94 to be monitored is within the horopter of the cameras.

Camera 70 includes a lens 100 and a pixel array 110. Likewise, camera 72 includes a lens 102 and a pixel array 112. Since the cameras 70 and 72 are located at different positions relative to the object 94, an image of the object 94 formed on the pixel array 110 of camera 70 differs from an image of the object 94 formed on the pixel array 112 of camera 72. The distance between the viewpoints of the cameras 70 and 72 (i.e., the distance between the lenses 100 and 102 ), is designated "b" in FIG. 2. The focal length of the lenses 100 and 102 of the cameras 70 and 72 is designated as "f" in FIG. 2. The lenses 100 and 102 of the cameras 70 and 72 of FIG. 2 have the same focal lengths. The horizontal distance from the image center on the pixel array 110 and the image of the object 94 on the pixel array 110 of camera 70 is designated "dl" in FIG. 2. The horizontal distance from the image center on the pixel array 112 and the image of the object 94 on the pixel array 112 for the camera 72 is designated "dr" in FIG. 2. Preferably, the cameras 70 and 72 are mounted so that they are in the same image plane. The difference between dl and dr is referred to as the "image disparity" and is directly related to the distance, designated "r" in FIG. 2, to the object 94 where the distance r is measured normal to the image plane of cameras 70 and 72 from a location v on the image plane. It will be appreciated that $$r = bf/d, \text{ where } d = dl - dr.\qquad\text{(Equation 1)}$$

From equation 1, the distance r to the object 94 as a function of disparity of the images from cameras 70 and 72 can be determined. It should be appreciated that the distance r is an inverse function of disparity.

Figure 3:
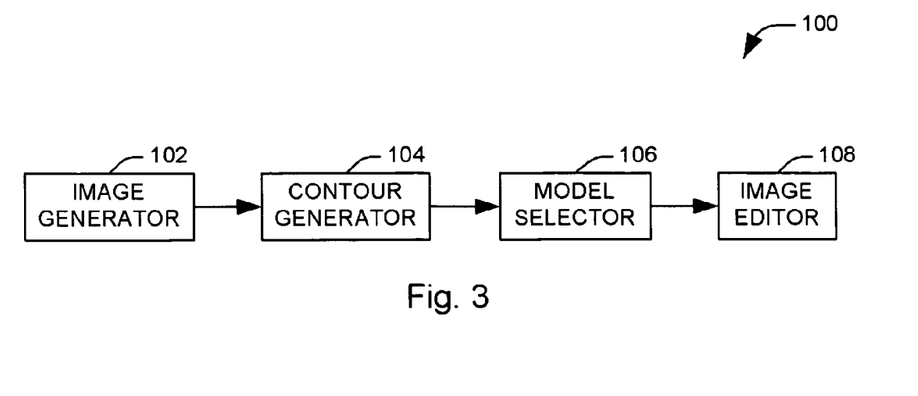
FIG. 3 illustrates an imaging system utilizing an automated passenger seat detection and removal in accordance with an aspect of the present invention.

Referring to FIG. 3, an imaging system 100 utilizing an automated passenger seat detection and removal is shown. It will be appreciated that one or more portions of the system 100 can be implemented as computer software on a general purpose processor. The system 100 includes an image generator 102 that obtains an image of a subject of interest. For example, the image generator 102 can include one or more sensors that are configured to obtain an image of the subject. During image generation, the image or images from the one or more sensors can be preprocessed to increase the associated dynamic range of the images and to remove static background elements. In an exemplary embodiment, the image generator 102 can produce a stereo disparity map from the outputs of two or more sensors.

The output of the image generator 102 is provided to a contour generator 104. The contour generator 104 produces a contour image from the image generator output containing an outline or contour of the provided images. For example, the contour generator 104 can comprise a Canny edge detector that produces a contour image from the output of the sensors. The contour image is then provided to a model selector 106. The model selector 106 searches the provided contour image for a contour corresponding to one of a plurality of seat back contour models. In accordance with an aspect of the invention, each of the seat models represents a contour of the seat back in a different possible position of the seat along one or more ranges of motion associated with the seat. When a match is found with a given contour model, the seat can be presumed to be in the position associated with the contour model.

Once a contour model has been selected, the image data is passed to an image editor 108. In one implementation, the image data passed to the image editor 108 can include a stereo image and its constituent sensor images. The image editor 108 removes a portion of the image corresponding to the seat back, guided by the selected seat model. Accordingly, the back of the seat can be removed with a heightened degree of precision, producing a clearer image of the seat occupant.

Figure 4:
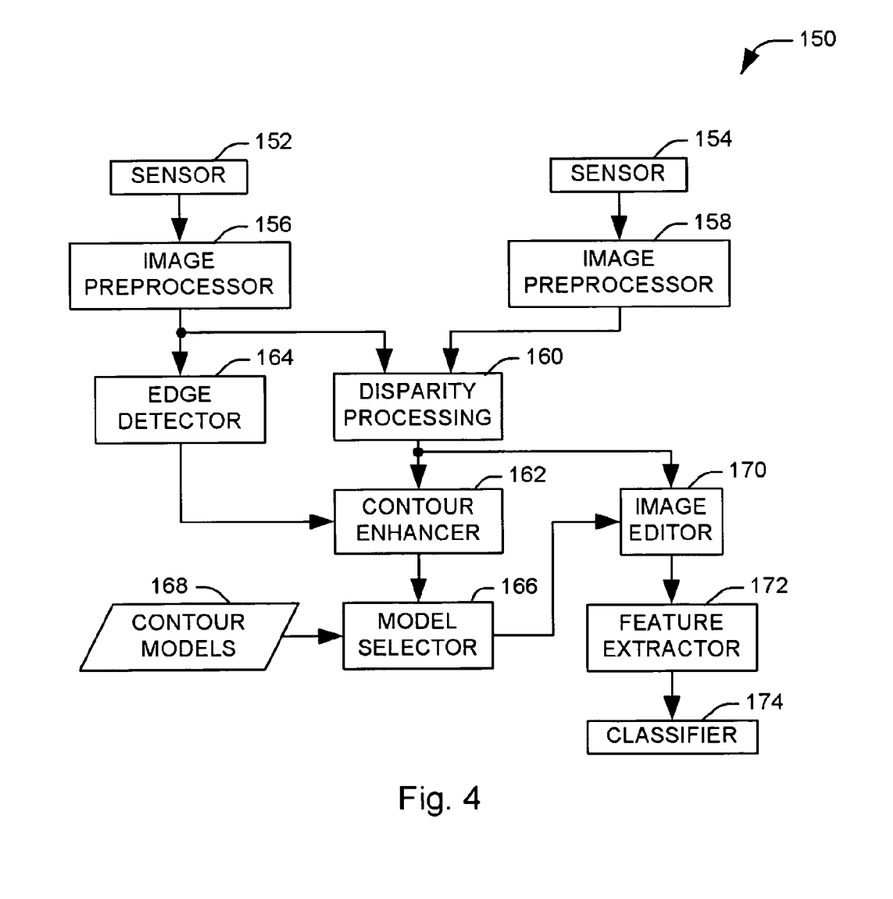
FIG. 4 illustrates a classification system utilizing automated seat removal in accordance with an aspect of the present invention.

FIG. 4 illustrates a classification system 150 utilizing automated seat removal in accordance with an aspect of the present invention. The system 150 includes a plurality of image sensors 152 and 154, each of which is operative to produce a two-dimensional image of a desired subject. It will be appreciated that the sensors can be of any appropriate design for a given application and can image a subject from reflected infrared, ultraviolet, and other electromagnetic radiation as well as light within the human visible spectrum. The sensors 152 and 154 are spaced apart by a desired distance to enable the cameras to be used for stereo imaging.

The images output from the two sensors 152 and 154 are provided to respective image preprocessors 156 and 158. Each of the preprocessors (e.g., 156) processes a received image to improve the quality of the image and to remove undesired portions of the image. For example, a static background associated with the position of a given camera can be subtracted from the image to leave an image of the seat and its occupant. Other processing can be performed to eliminate obvious noise from the image and increase its dynamic range.

The preprocessed images are provided to a disparity processing component 160. The disparity processing component 160 combines corresponding images from the sensors to produce a stereo disparity map associated with the two or more sensors, as described above in FIG. 2. The stereo disparity map is then provided as a first input to a contour enhancer 162. An image output from one of the image preprocessors (e.g., 156) is provided to an edge detector 164. In an exemplary implementation, an image associated with a given sensor (e.g., 152) is selected to correspond with the perspective of the stereo disparity map. The edge detector 164 produces a contour image from the provided image according to an edge detection algorithm. In an exemplary implementation, the edge detector 164 includes a Canny edge detector that analyzes an image to produce an image showing the positions of discontinuities in the intensity of the input image.

The image produced at the edge detector 164 is provided as a second input to the contour enhancer 162. The contour enhancer 162 combines the intensity data from the edge detector 164 output and the depth information from the stereo disparity map to produce a contour image. In one implementation of the invention, the output of the edge detector 164 is overlaid onto the stereo disparity map and all depth values not corresponding to an edge are set to zero. Accordingly, the contour image includes a three-dimensional contour, comprising its two dimensional position on the plane of the original image and the added depth information.

Once a contour image has been generated, it is provided to a model selector 166 that attempts to match one of a plurality of three-dimensional seat contour models 168 to at least a portion of the generated contour image. Each of the seat contour models 168 represents a three-dimensional representation of a rearward contour of the seat in a potential positioning along one or more ranges of motion. It will be appreciated that not every possible range of motion associated with the seat needs to be accounted for in the contour models, as some may create insignificant changes in the contour of the seat back for a given camera perspective.

For example, models could be generated to represent any of twenty-one horizontal positions (e.g., with respect to the front of the vehicle) and eleven reclined positions of the seat back. Accordingly, a set of two hundred thirty-one contour models would be utilized for determining the position of the seat. It will be appreciated, however, additional sets of contour models would be necessary for different types of seats, such as seats of different material (e.g., leather, cloth, etc.), and different construction. In one implementation, the contour models include an associated headrest, but for the purposes of the present example, a separate matching process for the headrest is utilized.

Each contour model is then compared to the contour image to determine if the contour model matches a portion of the contour image at a plurality of representative points associated with the contour model. In the matching process, each point associated with the contour model can be projected upon a location on the image corresponding to the seat back and a pixel-by-pixel correspondence between points on the contour model and pixels on the contour image can be determined. The correspondence can be quantified and an appropriate contour model selected according to an appropriate algorithm, such as a generalized Hough transform, as described by D. H. Ballard. [D. H. Ballard, Generalizing the Hough Transformion to Detect Arbitrary Shapes, Pattern Recognition, 13(2): 111-122, 1981].

In a generalized Hough transform, a feature or contour having a known shape and orientation can be located within an image. The generalized Hough transform can be utilized to located features that cannot be described by a simple analytical equation. First, an arbitrary reference point within the image can be selected, from which the shape of the feature can be defined according to a series of normal lines between the points in the line and the reference point. The parameters for each line (e.g., the slope and normal distance from the reference point) can be inputted into a lookup table representing the contour model.

A Hough transform space can be defined in terms of possible reference points for the image. An accumulator data structure is then defined representing the possible reference points. For each pixel within the edge image, an edge direction is located for the image and each potential reference point associated with the pixel is assigned points within the accumulator. A reference point can be determined by finding the reference point having the greatest number of accumulated points. The models can then be evaluated for fitness given the determined reference point.

For example, the correspondence can be quantified as a sum of the squared differences between the location of each point in the contour model and a corresponding pixel on the contour image. For each point, a corresponding pixel can be determined according to a "nearest neighbor" approach. Since a given pixel or representative point can have a depth value as well as associated x and y coordinates within its associated image or model, the nearest neighbor for a point on the contour model can be determined as the pixel having the smallest overall distance over all three dimensions. The selection of a corresponding pixel can be limited to a three dimensional window around the evaluated point, such that the selected neighboring pixel cannot exceed a threshold distance in any direction. If no corresponding pixel is found within the window, a default distance value can be assigned to the evaluated pixel. The distance values calculated for each contour model are squared, summed, and normalized according to the size of the contour model (e.g., the number of representative points). The model having the smallest overall normalized distance is then selected.

Once a model is selected, the position of the seat can be determined to be the associated seat position of the selected contour model. Using this information, the position of a headrest associated with the seat can be determined. A plurality of headrest contour models can be determined according to associated ranges of motion associated with the headrest. The headrest models can include ranges of motion associated with the seat, or can ignore seat motion that does not significantly impact the appearance of the headrest contour. The determined seat position can be used to define a search window for the headrest. The contour models can be compared to the contour image at a number of positions within the search window to determine an optimal position, for example, the position that produces a minimum distance score. The optimal score for each model is determined, and the model having the lowest overall score is selected, along with determined optimal position.

The selected models are provided to an image editor 170 that eliminates the seat back and head rest from the stereo disparity map. In the illustrated example, a best-fit line can be determined for the rearward edge of the seat back according to a least squares analysis of the pixels within the contour image matching pixels within the contour model. The line produced from this analysis can be used to derive a separation plane for the image, representing the forward plane of the seat back. In one example, a forward offset, corresponding to a function of the seat width and the angle of the seat, can be applied to determine an appropriate separation plane. The portion of the image between the separation plane and the determined line can be removed, with the remainder of the image representing the seat occupant.

The edited image is provided to a feature extractor 172, where the image is analyzed to produce a feature vector for classification. A feature vector represents an image as a plurality of elements, where each element represents an image feature. For example, the elements of the feature vector can represent average or variance measure of the depth values within one or more regions of the image. In addition, the seat position determined from the selected contour model can be utilized to produce one or more feature values.

The extracted feature vector is then provided to the classifier 174. The classifier 174 can be implemented as any of a number of intelligent systems suitable for classifying an input image into one of a plurality of output classes. In the illustrated example, the classes include an adult human, a child, and a rearward facing infant seat, among other classes. In an exemplary embodiment, the classifier 174 can utilize one of a support vector machine algorithm or an artificial neural network learning algorithm. It will be appreciated that the classifier 174 can comprise a plurality of individual classification systems united by an arbitration system that selects between or combines their outputs.

Figure 5:
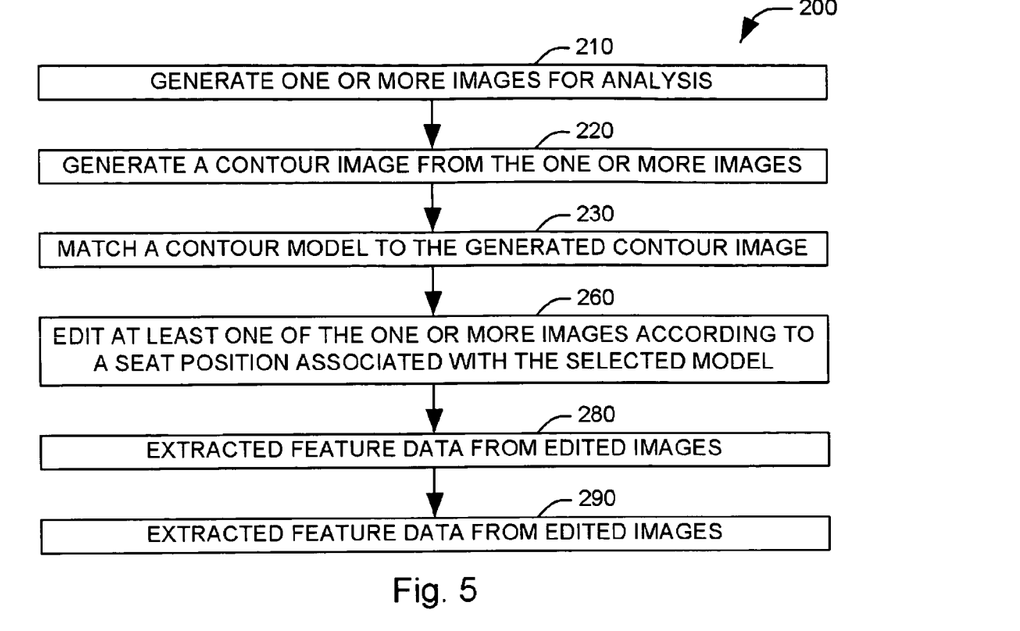
FIG. 5 illustrates a methodology for classifying a vehicle occupant utilizing automated seat removal in accordance with an aspect of the present invention.

FIG. 5 illustrates an exemplary methodology 200 for classifying a vehicle occupant utilizing automated seat removal in accordance with an aspect of the present invention. The methodology 200 begins at step 210 where an image is generated of a vehicle seat. It will be appreciated that multiple cameras can be utilized to generate images of a common subject from multiple perspectives, as to facilitate the generation of a stereo disparity map from the generated images. The methodology then advances to step 220, where a contour image is generated from the one or more images. This can be done by any appropriate means for detecting abrupt changes in intensity throughout an image, such as a Canny edge detector. It will be appreciated that the contour image can contain depth information such that the contour image provides a three-dimensional representation of one or more contours depicted by the images.

At step 230, a contour model is matched to the contour of the seat in the contour image. A plurality of stored contour models can be compared to an appropriate location or locations in the contour image to determine which contour model most closely resembles the contour of the seat back. Once a matching contour model is selected, the image is edited at step 260. For example, a line representing the rearward edge of the seat can be determined from the image data and the selected contour model. From this line and prior knowledge of the width of the seat back, a separation plane between the seat occupant and the seat back can be established. The portion of the image between the two lines can be excised to isolate the image of the occupant.

At step 280, feature data is extracted from the input image in the form of a feature vector. A feature vector represents an image as a plurality o-f elements corresponding to features of interest within the image. Each element can assume a value corresponding to a quantifiable image feature. It will be appreciated the image features can include any quantifiable features associated with the image that are useful in distinguishing among the plurality of output classes. Exemplary features can include the average brightness within one or more selected regions of the image, the variance of the grayscale values of the pixels comprising one or more selected regions within the image, and a coarseness measure of one or more selected regions of the image. In an exemplary embodiment, the determined seat position can itself be utilized to provide one or more features for classification.

At step 290, the feature vector can be classified to determine a class for the vehicle occupant. In accordance with the present invention, each image can be classified into one of a plurality of finite possible classes such as an empty seat class, an adult class, a child class, a rearward facing child seat class, and a forward facing child seat class. These classes are given only for the purpose of example, and less or more classes can be used as well as classes different from those listed. The classification process can utilize any of a number of intelligent systems suitable for classifying an input image. In an exemplary embodiment, one of a Support Vector Machine ("SVM") algorithm or an artificial neural network ("ANN") learning algorithm can be utilized to classify the image into one of a plurality of output classes.

A SVM classifier can utilize a plurality of functions, referred to as hyperplanes, to conceptually divide boundaries in the N-dimensional feature space, where each of the N dimensions represents one associated feature of the feature vector. The boundaries define a range of feature values associated with each class. Accordingly, an output class can be determined for a given input feature vector according to its position in feature space relative to the boundaries.

An ANN classifier comprises a plurality of nodes having a plurality of interconnections. The values from the feature vector are provided to a plurality of input nodes. The input nodes each provide these input values to layers of one or more intermediate nodes. A given intermediate node receives one or more output values from previous nodes. The received values are weighted according to a series of weights established during the training of the classifier. An intermediate node translates its received values into a single output according to a transfer function at the node. For example, the intermediate node can sum the received values and subject the sum to a binary step function.

Figure 6:
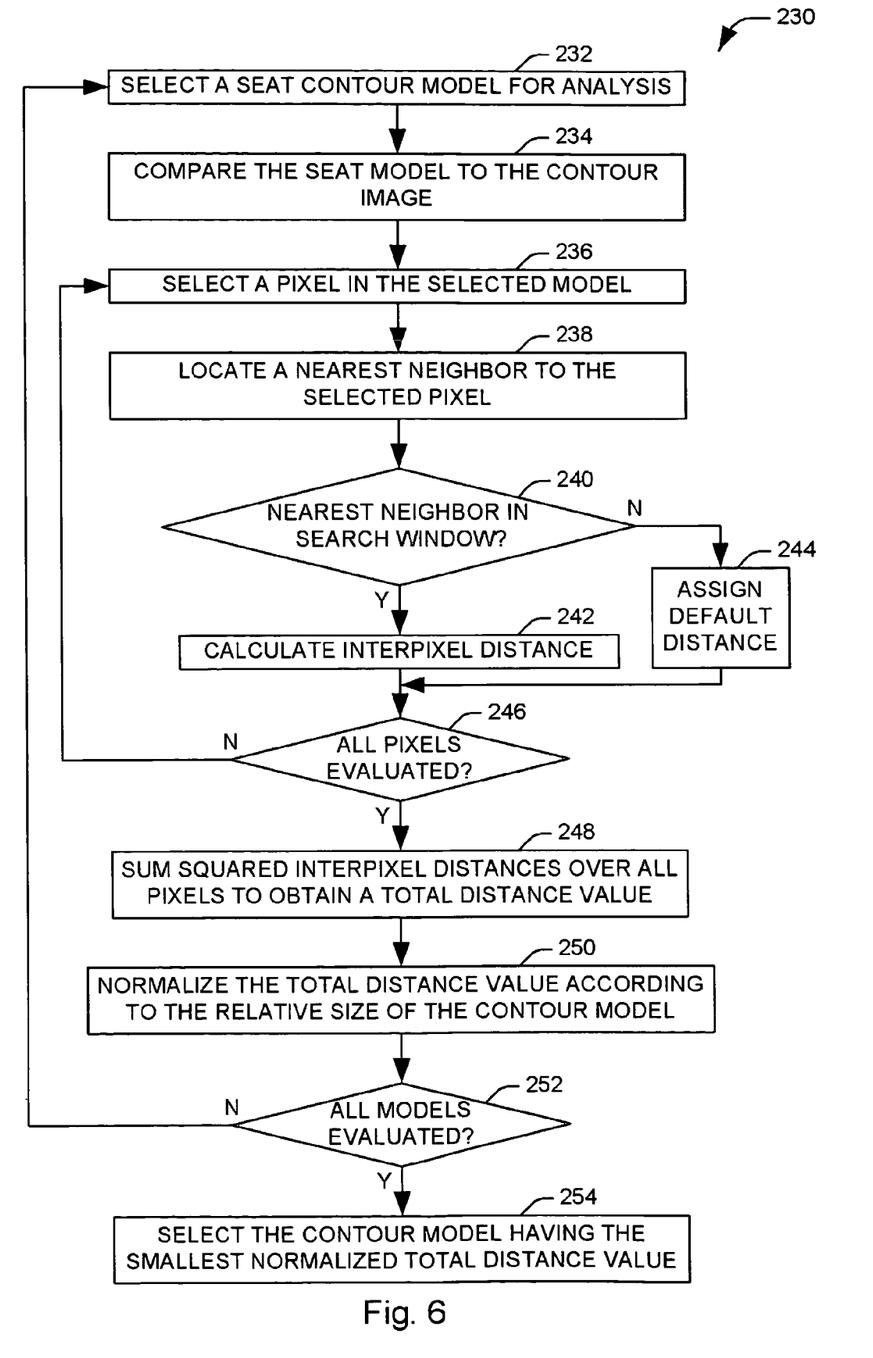
FIG. 6 illustrates a methodology for selecting a contour model in accordance with an aspect of the present invention.

FIG. 6 illustrates a methodology 230 for selecting a contour model in accordance with an aspect of the present invention. The process begins at step 232 where a three-dimensional seat contour model is selected from a plurality of available seat contour models for analysis. Each of the contour models represents the rearward contour of the seat from a side view when the seat is in a given position, according to one or more ranges of motion associated with the seat. It will be appreciated that the contour models comprise both two-dimensional position data within the plane of the image as well as depth information associated with the given seat position. The contour models can be selected in a predetermined order or can be selected according to feedback from an occupant protection system. At step 234, the selected contour model is compared to a contour image depicting a vehicle seat.

For example, the position of the pixels in the contour model can be assigned corresponding locations within a coordinate system defined by the contour image to allow for the comparison of the pixel positions across the contour model and the contour image. It will be appreciated that the contour models can be generated utilizing the same perspective as the contour images provided for analysis for a given vehicle, such that the correspondence between pixel locations on the contour model and the contour image is straightforward.

The contour model can comprise a number of points, corresponding to selected representative pixels within the contour model. At step 236, a point in the selected model is selected. The pixels can be selected in a predetermined order associated with the contour model. At step 238, a "nearest neighbor" to the selected point is determined from the points comprising the contour image. This can be accomplished by any of a number of nearest neighbor search algorithms that are known in the art. At step 240, it is determined if the determined nearest neighbor is within a defined search window. The search window can be defined to prevent a neighboring pixel from exceeding a threshold distance from the selected point in any of the coordinate dimensions. As will be appreciated, the coordinate dimensions can include the width and height dimensions in a two-dimensional image, as well as depth in a stereo disparity image.

If the neighboring pixel is within the defined search window (Y), the distance between the selected point and the neighboring pixel is calculated at step 242. It will be appreciated that any of a number of distance measures can be utilized, including Euclidean and Manhattan distances. The methodology then advances to step 246. If the neighboring pixel is not in the defined search window (N), a default distance greater than the maximum range of the search window is assigned at step 244, and the methodology advances to step 246.

At step 246, it is determined if all of the points within the contour model have been evaluated. If not (N), the methodology returns to step 236, where another point is selected. Once all points have been selected (Y), the methodology advances to step 248, where the squares of the determined distance values for the plurality of points within the contour are summed to form a total distance value. The total value is then normalized according to the size (e.g., area, volume, or number of representative points) of the contour model at step 250. Appropriate normalization values for each contour model can be determined when the contour models are generated. In one implementation, the normalization includes dividing the sum of the squared distances by the number of points in the contour model.

At step 252, it is determined if all the plurality of contour models have been evaluated. If not (N), the methodology returns to step 232, where another model is selected. Once all models have been evaluated (Y), the methodology advances to step 254, where the model having the smallest normalized total distance value is selected. The methodology 200 then terminates.

Figure 7:
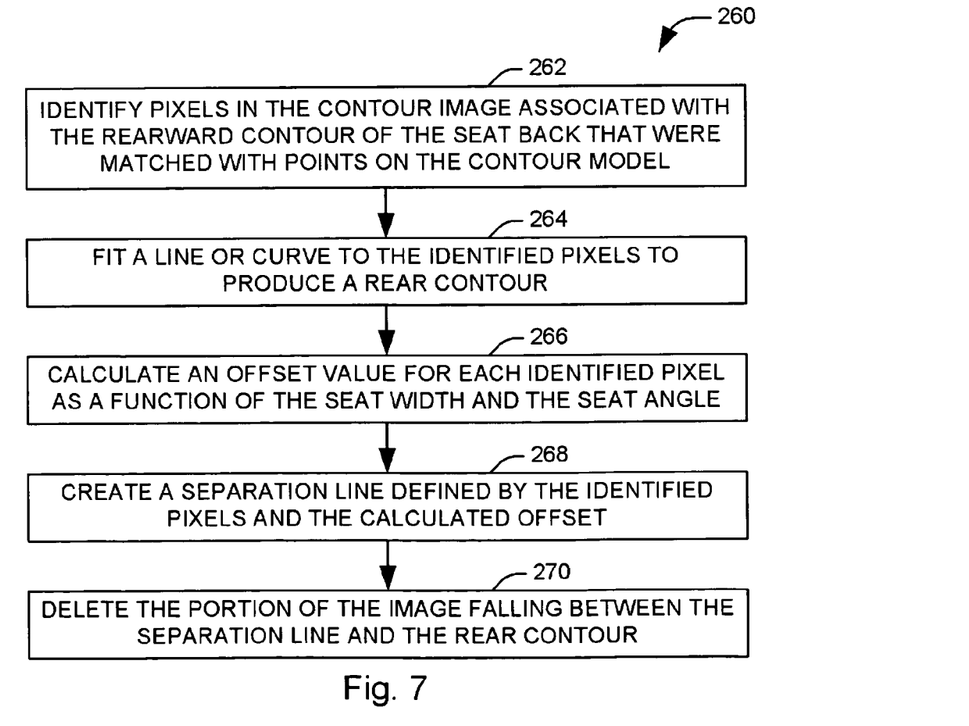
FIG. 7 illustrates a methodology for editing an image to remove a seat back from an image of interest given a selected contour model.

FIG. 7 illustrates a methodology 260 for editing an image to remove a seat back from an image of interest given a selected contour model. The methodology 260 begins at step 262, where a number of pixels within the contour image are identified as being associated with the rear contour of the seat back. Specifically, pixels that were matched (e.g., identified as nearest neighbors) with points within the contour model are identified on the image of interest. It will be appreciated that the contour image is generated from the image of interest, such that a direct correlation exists between pixels in the contour image and pixels within the image of interest.

Once the points have been identified, the points are fitted to a best fit line to form a rear contour at step 264. Since the seat back will generally approximate a straight line from a side view, the best fit line can be determined according to a linear least squares analysis. For other views or seats lacking a straight line contour along the back, other line and curve fitting algorithms can be used to determine the position of the rear contour of the seat. At step 266, an offset value is determined for each of the identified pixel. In accordance with an aspect of the present invention, the offset value is calculated at each point as a function of the expected seat width and the angle of the seat back, as determined from the selected contour model. For example, the offset can be calculated for each pixel as:

$$X_0 = \frac{w}{\cos(\Theta)} \quad \text{(Equation 2)}$$

where $X_0$ is a horizontal offset value, w is the expected seat width at a given pixel, and $\Theta$ is an angle derived from the slope of the fitted line.

At step 268, a separation line is created from the identified pixels and the calculated offsets. For example, the separation line can be defined for each pixel by defining new pixels frontward (e.g., toward the front of the vehicle) of each identified pixel and fitting a line to the new pixels. The separation line is intended to define within the image of interest the plane of separation between the seat and the vehicle occupant. The methodology then advances to step 270 where the portion of the image between the separation line and the rear contour is removed. The remaining portion of the image should contain the vehicle occupant, allowing for more accurate classification of the vehicle occupant.

Figure 8:
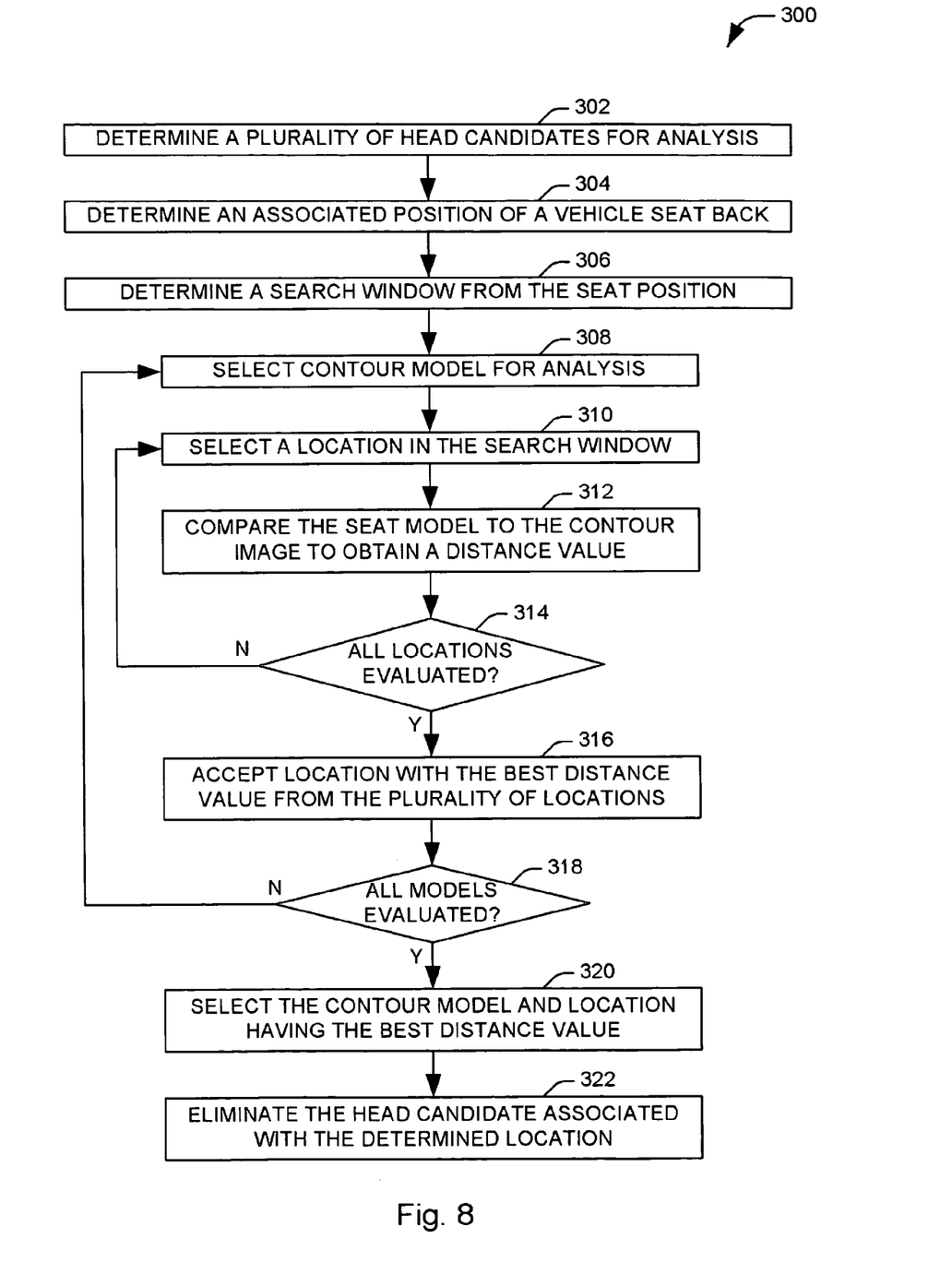
FIG. 8 illustrates a methodology for eliminating a candidate head location for a human vehicle occupant from a pool of candidate head locations in a head tracking system in accordance with an aspect of the present invention.

FIG. 8 illustrates a methodology 300 for eliminating a head location candidate for a vehicle occupant protection system in accordance with an aspect of the present invention. The methodology begins at step 302 wherein the system determines a plurality of head candidates according to a head candidate location algorithm. For example, an image from the vehicle occupant protection system can be analyzed to determine associated locations for one or more head candidates as well as information relating to the shape, motion, and appearance of the new candidates. Candidates having a threshold level of resemblance to a human head based on shape, motion, and appearance are retained as possible head candidates.

At step 304, an associated position of a seat back is determined. The seat back position can be determined as discussed above in FIGS. 5-7, with a contour model being matched to a contour associated to a rearward portion of the seat. At step 306, a search window for the headrest is established. The search window can be based on known ranges of motion for the headrest relative to the seat back. For example, the window can extend along the line of the rear seat contour for a distance equal to the range of extension from the seat back available for the headrest. Similarly, a narrow range normal to the seat back contour can be established based upon the position of the seat and any other range of motion available for the headrest.

At step 308, a headrest contour model is selected from a plurality of available contour models for analysis. Each of the contour models represents the contour of the headrest from a side view when the headrest is in a given position, according to one or more ranges of motion associated with the headrest. The contour models can be selected in a predetermined order or can be selected according to feedback from an occupant protection system. At step 310, a location within the search window is selected. For example, a starting pixel location for evaluating the headrest contour model can selected from a plurality of predetermined locations associated with the search window.

At step 312, the selected contour model is compared to a contour image depicting a vehicle seat. A distance score can be computed as a result of this comparison, for example, by determining the sum of the squared distance between corresponding pixels in the contour model and the contour image. At step 314, it is determined if all of the desired positions within the search window have been evaluated. If not (N), the methodology returns to step 310, where another position is selected. Once all points have been selected (Y), the methodology advances to step 316, where the location having the best overall distance value is selected.

At step 318, it is determined if all the plurality of contour models have been evaluated. If not (N), the methodology returns to step 308, where another model is selected. Once all models have been evaluated (Y), the methodology advances to step 320, where the model and location having the best distance value is selected. The methodology then advances to step 322, where a head candidate associated with the identified location is eliminated. Generally, the remaining rearmost head candidate will represent the occupant's head, but other head location and tracking algorithms can be applied to definitely identify the proper candidate.

Figure 9:
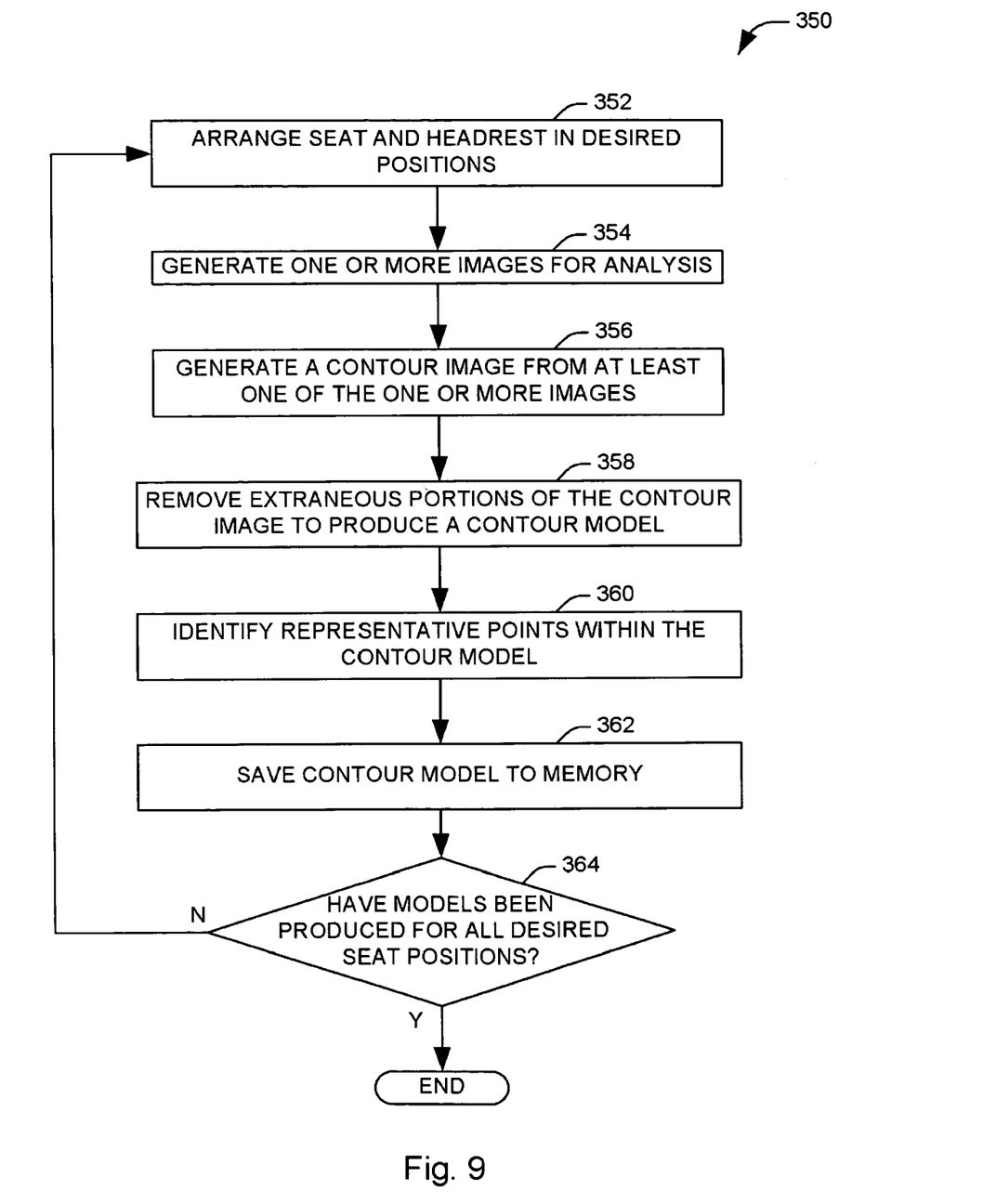
FIG. 9 illustrates a methodology for generating a set of contour models in accordance with an aspect of the present invention.

FIG. 9 illustrates a methodology 350 for generating a set of contour models in accordance with an aspect of the present invention. At step 352, the seat and headrest are arranged in a desired position relative to one or more ranges of motion. In the illustrated example, a given seat can have four ranges of motion, a horizontal range of motion toward the front or rear of the vehicle, a radial reclining of the seat back relative to the seat bottom, a vertical motion of the frontward potion of the seat bottom, and a vertical motion of the rearward portion of the seat bottom. A headrest can be operative to be moved vertically as well as reclined over a small radius of movement.

A plurality of discrete positions can be selected along each of the ranges of motion. The number of positions selected along each range will depend on a desired level of run-time processing resources associated with the contour matching process. It will be appreciated that not every range of motion associated with the seat and the headrest must be represented in the generated seat contour models. For example, the vertical motion of the frontward and rearward portions of the seat can be determined to have a minimal effect on the appearance of the seat contour, such that it can be neglected in the generation of contour models. Eleven equally spaced positions for the seat back and twenty-one equally spaced horizontal positions can be utilized for a total of two hundred and thirty-one positions. Similarly, the headrest may have ten vertical positions that are modeled for locating the headrest.

Once a position is selected, one or more images of the seat are generated at step 354. It will be appreciated that the generated images can include two-dimensional images as well as three-dimensional images, such as stereo disparity maps. At step 356, a contour image is generated from at least one of the one or more images. For example, an image can be subjected to an edge detection algorithm, such as the Canny edge detection algorithm, to produce the contour image. Extraneous portions of the contour image are removed from the image to isolate the rearward contour of the seat back and the headrest at step 358. For example, a portion of the image that is known to be unassociated with the rearward edge of the seat back and the headrest can be removed via an automated process. The headrest and the seat back can then be separated into two separate models, if desired. Alternatively, the image can be provided to a human analyst for editing via a user interface.

At step 360, representative points are selected within each generated contour model. For example, the points can be selected in an automated fashion at predetermined intervals along the contours, or they can be selected directly by a human analyst. The contour models can then saved to a memory at step 362. The methodology 350 then advances to step 364, where it is determined if contour models have been produced for all desired seat positions. If not (N), the methodology returns to step 352 to select a new seat position. Once all of the seat positions have been modeled (Y), the methodology terminates.

Figure 10:
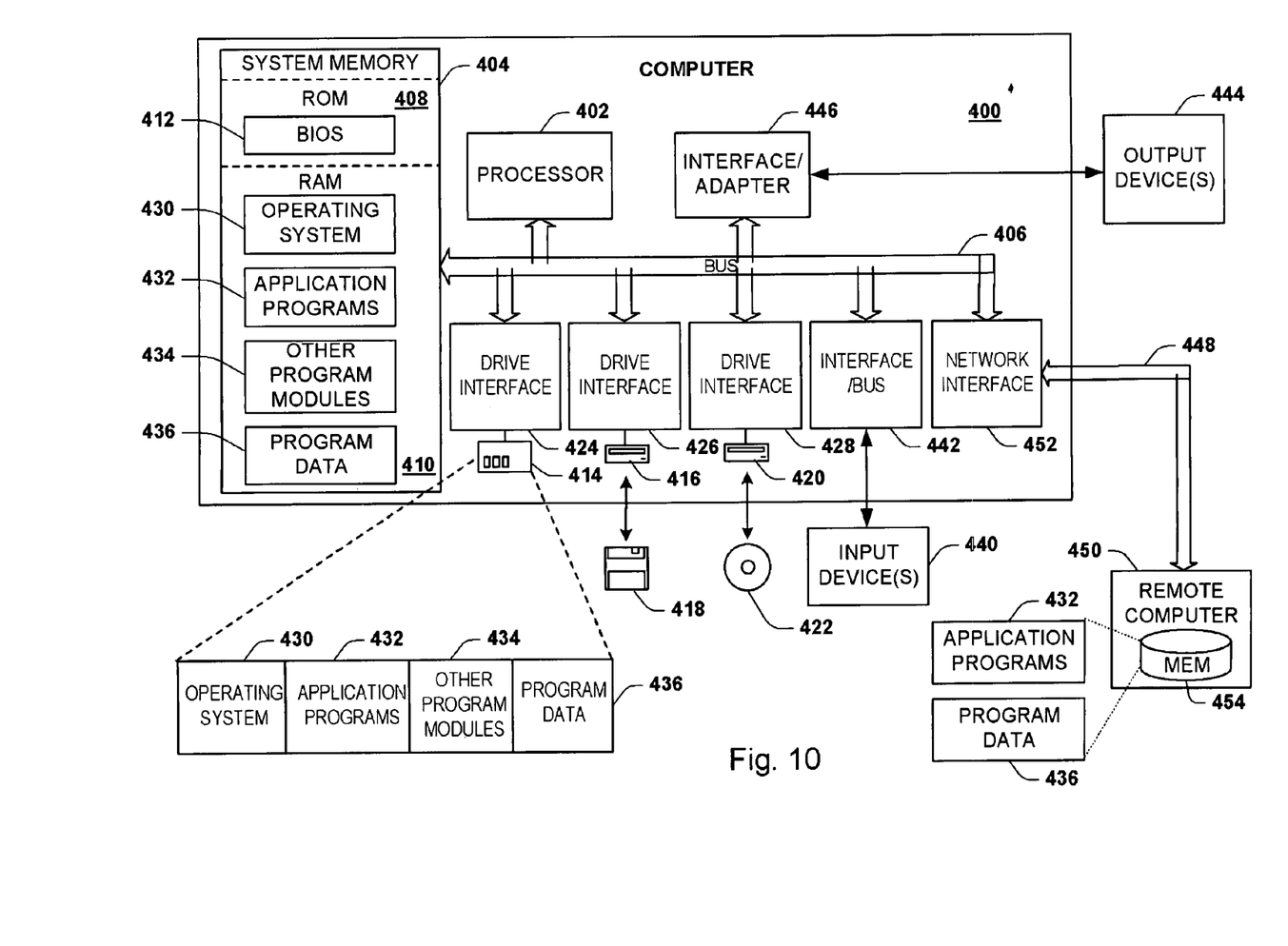
FIG. 10 illustrates a computer system that can be employed to implement systems and methods described herein, such as based on computer executable instructions running on the computer system.

FIG. 10 illustrates a computer system 400 that can be employed to implement systems and methods described herein, such as based on computer executable instructions running on the computer system. The computer system 400 can be implemented on one or more general purpose networked computer systems, embedded computer systems, routers, switches, server devices, client devices, various intermediate devices/nodes and/or stand alone computer systems. Additionally, the computer system 400 can be implemented as part of the computer-aided engineering (CAE) tool running computer executable instructions to perform a method as described herein.

The computer system 400 includes a processor 402 and a system memory 404. A system bus 406 couples various system components, including the system memory 404 to the processor 402. Dual microprocessors and other multi-processor architectures can also be utilized as the processor 402. The system bus 406 can be implemented as any of several types of bus structures, including a memory bus or memory controller, a peripheral bus, and a local bus using any of a variety of bus architectures. The system memory 404 includes read only memory (ROM) 408 and random access memory (RAM) 410. A basic input/output system (BIOS) 412 can reside in the ROM 408, generally containing the basic routines that help to transfer information between elements within the computer system 400, such as a reset or power-up.

The computer system 400 can include a hard disk drive 414, a magnetic disk drive 416 (e.g., to read from or write to a removable disk 418) and an optical disk drive 420 (e.g., for reading a CD-ROM or DVD disk 422 or to read from or write to other optical media). The hard disk drive 414, magnetic disk drive 416, and optical disk drive 420 are connected to the system bus 406 by a hard disk drive interface 424, a magnetic disk drive interface 426, and an optical drive interface 434, respectively. The drives and their associated computer-readable media provide nonvolatile storage of data, data structures, and computer-executable instructions for the computer system 400. Although the description of computer-readable media above refers to a hard disk, a removable magnetic disk and a CD, other types of media which are readable by a computer, may also be used. For example, computer executable instructions for implementing systems and methods described herein may also be stored in magnetic cassettes, flash memory cards, digital video disks and the like.

A number of program modules may also be stored in one or more of the drives as well as in the RAM 410, including an operating system 430, one or more application programs 432, other program modules 434, and program data 436.

A user may enter commands and information into the computer system 400 through user input device 440, such as a keyboard, a pointing device (e.g., a mouse). Other input devices may include a microphone, a joystick, a game pad, a scanner, a touch screen, or the like. These and other input devices are often connected to the processor 402 through a corresponding interface or bus 442 that is coupled to the system bus 406. Such input devices can alternatively be connected to the system bus 406 by other interfaces, such as a parallel port, a serial port or a universal serial bus (USB). One or more output device(s) 444, such as a visual display device or printer, can also be connected to the system bus 406 via an interface or adapter 446.

The computer system 400 may operate in a networked environment using logical connections 448 to one or more remote computers 450. The remote computer 448 may be a workstation, a computer system, a router, a peer device or other common network node, and typically includes many or all of the elements described relative to the computer system 400. The logical connections 448 can include a local area network (LAN) and a wide area network (WAN).

When used in a LAN networking environment, the computer system 400 can be connected to a local network through a network interface 452. When used in a WAN networking environment, the computer system 400 can include a modem (not shown), or can be connected to a communications server via a LAN. In a networked environment, application programs 432 and program data 436 depicted relative to the computer system 400, or portions thereof, may be stored in memory 454 of the remote computer 450.

From the above description of the invention, those skilled in the art will perceive improvements, changes, and modifications. Such improvements, changes, and modifications within the skill of the art are intended to be covered by the appended claims.

Having described the invention, the following is claimed:

1. A method for preprocessing an image of a vehicle interior to remove a portion of the image corresponding to a seat back comprising:
   generating a contour image from the image;
   selecting one of a plurality of contour models that most closely matches the generated contour image, a given contour model being associated with one of a plurality of possible seat positions;
   determining a plane of separation between a seat back and a seat occupant within the image based on the selected contour model; and
   removing a portion of the image corresponding to the seat back based on the determined plane of separation to isolate an image of the seat occupant.

2. The method of claim 1, wherein each of the contour models represents a three-dimensional contour.

3. The method of claim 1, further comprising locating a headrest associated with the seat according to the selected contour model.

4. The method of claim 3, further comprising eliminating a head candidate from an associated head tracking algorithm according to the located headrest.

5. The method of claim 1, wherein selecting a contour model includes projecting a plurality of representative points associated with each contour model onto a coordinate plane defined by the contour image and determining the sum of the squared distances between the representative points and neighboring points on the contour image.

6. The method of claim 1, further comprising classifying the image of the seat occupant into one of a plurality of output classes.

7. The method of claim 6, further comprising providing the selected one of the plurality of output classes to a controller for a vehicle occupant protection system.

8. The method of claim 1, wherein determining a plane of separation includes determining a rear contour of the seat based on the selected contour model and calculating an associated offset for a plurality of points on the rear contour.

9. The method of claim 1, wherein generating a contour image includes applying an edge detection algorithm to a grayscale image of the vehicle interior.

10. The method of claim 1, wherein generating a contour image includes generating a stereo disparity map of the vehicle interior.

11. The method of claim 10, wherein generating a contour image includes applying an edge detection algorithm to a grayscale image of the vehicle interior and combining the resulting image with the stereo disparity map to produce a three-dimensional contour.

12. The method of claim 1, wherein selecting one of a plurality of contour models includes determining an associated reference location within the contour image for each of the plurality of contour models.

13. A system for editing an image of a vehicle interior to isolate the occupant of a vehicle seat comprising:
    an image generator that generates an image of a vehicle interior;
    a contour generator that produces a contour image from the generated image;
    a model selector that selects a contour model from a plurality of contour models according to the similarity of the contour model to a portion of the contour image; and
    an image editor that removes a portion of the generated image representing at least a portion of the vehicle seat according to the selected contour, model to produce an image of an occupant of the vehicle seat.

14. The system of claim 13, the contour generator including a Canny edge detector that locates abrupt changes in-intensity in a grayscale image.

15. The system of claim 13, the image generator comprising a disparity processing component that creates a stereo disparity map from a plurality of images.

16. The system of claim 13, a given contour model representing the rearmost contour of a vehicle seat when the seat assumes one of a plurality of possible positions.

17. The system of claim 13, further comprising a pattern recognition classifier that classifies the image of the occupant of the vehicle seat into one of a plurality of output classes.

18. A computer program product, implemented in a computer readable medium and operative in a data processing system, for editing an image of a vehicle interior to isolate the occupant of a vehicle seat comprising:
    a contour generator that produces a contour image from one or more generated images;
    a model selector that selects a contour model from a plurality of contour models according to the contour image and an associated selection algorithm; and
    an image editor that edits the generated image to remove a portion of the image representing the vehicle seat according to the selected contour model.

19. The computer program product of claim 18, wherein the model selector selects a contour model representing a headrest associated with the vehicle seat and provides the location of the headrest to an associated occupant head tracking algorithm to eliminate a head candidate within the algorithm.

20. The computer program product of claim 18, a given contour model representing the rearmost contour of the vehicle seat when the seat assumes one of a plurality of possible positions.

21. The computer program product of claim 18, the model selector being operative to project a plurality of representative points associated with each contour model onto a coordinate plane defined by the contour image and determine the sum of the squared distances between the representative points and neighboring points on the contour image.

22. The computer program product of claim 18, further comprising a pattern recognition classifier that is operative to classify the edited image into one of a plurality of output classes and provide a classification output to an associated vehicle occupant protection system.

* * * * *